(12) United States Patent
Winterowd

(10) Patent No.: US 9,090,731 B2
(45) Date of Patent: Jul. 28, 2015

(54) LIQUID KRAFT LIGNIN COMPOSITIONS

(71) Applicant: WEYERHAEUSER NR COMPANY, Federal Way, WA (US)

(72) Inventor: Jack G. Winterowd, Puyallup, WA (US)

(73) Assignee: Weyerhaeuser NR Company, Federal Way, WA (US)

( * ) Notice: Subject to any disclaimer, the term of this patent is extended or adjusted under 35 U.S.C. 154(b) by 41 days.

(21) Appl. No.: 13/853,938

(22) Filed: Mar. 29, 2013

(65) Prior Publication Data

US 2014/0296429 A1   Oct. 2, 2014

(51) Int. Cl.
| | |
|---|---|
| *C08G 8/24* | (2006.01) |
| *C08L 97/00* | (2006.01) |
| *C08K 5/21* | (2006.01) |
| *C08G 8/38* | (2006.01) |
| *C09J 161/06* | (2006.01) |
| *C09J 197/00* | (2006.01) |

(52) U.S. Cl.
CPC .. *C08G 8/24* (2013.01); *C08G 8/38* (2013.01); *C08K 5/21* (2013.01); *C08L 97/005* (2013.01); *C09J 161/06* (2013.01); *C09J 197/005* (2013.01)

(58) Field of Classification Search
CPC .......... C08K 5/21; C08L 97/005; C08G 8/24; C08G 8/38
USPC ................................................ 524/72, 73, 74
See application file for complete search history.

(56) References Cited

U.S. PATENT DOCUMENTS

| | | | |
|---|---|---|---|
| 2,282,518 A | 5/1942 | Hockwalt | |
| 3,285,801 A | 11/1966 | Sarjeant | |
| 4,105,606 A * | 8/1978 | Forss et al. | 524/73 |
| 5,866,642 A | 2/1999 | McVay et al. | |
| 6,632,912 B2 | 10/2003 | Sudan | |
| 2002/0065400 A1 | 5/2002 | Raskin et al. | |
| 2011/0245381 A1 | 10/2011 | Winterowd et al. | |

* cited by examiner

*Primary Examiner* — Vickey Nerangis
(74) *Attorney, Agent, or Firm* — Timothy M. Whalen

(57) ABSTRACT

Liquid kraft lignin compositions, methods of their production, and various methods of their use, including in preparing kraft lignin-containing LPF resins, which may in turn be used in producing OSB or other wood-based composites, and methods of assaying lignin content in such compositions, are disclosed. In an illustrative and non-exclusive embodiment, a liquid kraft lignin composition includes water in the amount of about 60-95% by weight, urea about 5-30% by weight, a group 1 alkaline metal hydroxide about 0.5-3.0% by weight, and kraft about 5-25% by weight on a dry basis.

19 Claims, No Drawings

LIQUID KRAFT LIGNIN COMPOSITIONS

TECHNICAL FIELD

This disclosure relates to liquid kraft lignin-containing compositions, methods of their production, methods of using such compositions in the production of kraft-lignin-containing liquid phenol/formaldehyde (LPF) resins, and use of such kraft-lignin-containing LPF resins in the production of OSB or other wood-based composites.

BACKGROUND

Oriented strandboard (OSB) is a wood-based composite used in construction, furniture-making, and other applications. OSB is made by cutting and drying wood strands, applying wax and bonding resin (binder) to the strands, forming the treated strands into a continuous mat, and consolidating the mat under heat and pressure, usually in a hot press. On average, strands in OSB are about 1/32" thick, 1/2" to 1 1/2" wide, and 2-6" long. The OSB mat usually includes discrete surface and core layers. Strands in the surface layers are generally larger than those used in the core layer, and are oriented parallel to the machine direction of the mill forming line. Conversely, strands in the core layer are oriented in the cross-machine direction.

Different bonding resin types are used to make OSB: liquid phenol/formaldehyde resole resins (LPF), such as Georgia-Pacific's 70CR66 resin; powdered phenol/formaldehyde resole resins (PPF), such as Hexion's W3154N resin; and polymeric diphenylmethane diisocyanate (pMDI) resin such as Huntsman's Rubinate 1840. A resole resin is a resin made under base-catalyzed conditions with a formaldehyde-to-phenol molar ratio greater than one.

Each resin type has its own set of performance characteristics. For example, LPF resins are lower in cost, but develop bond strength slower than pMDI and are less tolerant of high moisture levels in the wood. PPF quickly develop bond strength and are more tolerant of moisture, but are more expensive than LPF, and application rates are more limited. pMDI resin also develops bond strength quickly, and the bonds tend to be stronger than equivalent levels of LPF or PPF, but pMDI is relatively expensive, often does not work well on dry strands, and tends to bond to the press platen.

Accordingly, different binder types are often used for different OSB mat layers. For instance, it is common for pMDI to be used in the core layer, which has a relatively low temperature and a high moisture content level during the hot-pressing cycle. LPF resins are often used in the surface layers where the temperature is relatively high and the moisture content is relatively low. PPF resins are used in combination with either pMDI or LPF resins to achieve an improved balance of cost and bond performance, but processing PPF resins often requires a substantial ventilation system to minimize release of powdered PF dust from production machinery.

To be suitable for OSB, liquid bonding resins must meet certain performance and application requirements. For example, typical OSB forming equipment can only accommodate resins having a viscosity lower than a certain threshold, for example about 500 centipoise (cps). In addition, other process considerations, such as resin pump size, targeted adhesive dosing rates, wood flow rates, and so forth, may further lower the threshold viscosity, for example to about 250-300 cps.

Viscosity limitations are important when a PF resin is being used as a bonding agent. In some cases an LPF resin can be heated just prior to spraying in order to reduce the viscosity, but a countervailing concern is to avoid heating the resin to the point of initiating the curing process prior to application to the strands. Another way to reduce the viscosity of an LPF resin is to increase the water content; however, this approach may result in excessive moisture levels in the OSB mat during hot-pressing, which may increase the risk of steam explosions during OSB production.

Yet another way to reduce LPF viscosity relates to its composition. LPF resins are essentially aqueous solutions of phenol/formaldehyde polymers (and oligomers), and reducing the average molecular size of the polymer (such as by reducing the average degree of polymerization of the phenol/formaldehyde adducts) correspondingly reduces the viscosity of the resin. However, if the average molecular weight of the phenol/formaldehyde adducts is too small, the LPF resin will fail to achieve adequate bond strength formation during the hot-pressing process. Achieving a balance of low viscosity, high solids content, and rapid bond strength development is a key challenge in formulating LPF resins that are targeted for use in the production of OSB.

Most LPF resins used for OSB contain urea, which is typically incorporated to reduce viscosity and consume free formaldehyde, although it does not directly contribute to bond strength development. Urea is well-suited for these functions by virtue of its reactivity, solubility, low molecular weight, low cost, availability, and favorable toxicity profile. It is quite common for urea levels in liquid PF resins for use in OSB to be about 15-40% based on the solids content of the resin. The high level of urea in liquid PF resins for use in OSB make such resins somewhat unique relative to PF resins used in other wood bonding applications.

As noted above, LPF resins used to make OSB are solutions of phenol/formaldehyde polymers (and oligomers). Such phenol/formaldehyde adducts are soluble in a sufficiently alkaline aqueous medium. In practice, this is achieved most commonly by use of sodium hydroxide, although other group 1 metal hydroxides, such as potassium hydroxide, can be used. Sodium hydroxide is a strong base which quantitatively reacts with the acidic alcohol functional group on the phenol to form a phenate sodium salt. Thus, conventional LPF resins used to make OSB are essentially composed of water, urea, and the sodium salt of phenol/formaldehyde polymers and oligomers.

Modified LPF compositions in which lignin has been incorporated into the resin have been proposed. Somewhat similar to urea, lignin has some ability to lower viscosity in an LPF resin, and can also sequester free formaldehyde (at elevated pH levels). In addition, lignin is thought to be able to directly contribute to bond strength in wood-gluing applications. The low cost and viscosity-reducing effect make lignin a suitable candidate for replacing a portion of the urea normally present in LPF resins. Normally, the bond-forming component in such resins consists of the phenol/formaldehyde adduct(s) present in such resins; as such, due to its potential contribution to bond strength development, lignin may optionally be a candidate to replace a portion of the phenol/formaldehyde adducts in such resins.

However, it has been found that many of such lignin-containing formulations tend to exhibit slow bond strength development during the OSB manufacturing process, and increase the rate at which the resulting OSB absorbs water. Lignosulfonate (sulfonated, degraded lignin), such as produced by the sulfite wood pulping process, is the predominant lignin type that has been explored for lignin-containing LPF resins, and is thought to cause fast water absorption rates in OSB.

Recently, work has also been conducted on the use of kraft lignin—such as produced by the kraft wood pulping process, and, unlike lignosulfonate, is mostly free of sulfonic acid groups—in OSB-type LPF resins. Indeed, certain types of kraft lignin have been incorporated into an LPF resin to produce a lignin-containing resin that exhibits performance similar to that of a conventional LPF resin. Examples of these latter compositions are described in the assignee's co-pending US Patent App. Pub. No. 20110245381 of Winterowd, et al.

Native lignin is a high-molecular-weight phenylpropane polymer that is present in wood at a level of about 24-35% in softwood and about 17-25% in hardwood. Native lignin in wood is not soluble in water, and one of its functions in the plant is to bond the cellulose fibers (wood cells) together. In the commercial kraft pulping process, wood chips are steeped in aqueous solutions of sodium sulfide and sodium hydroxide at elevated temperatures in order to degrade the native lignin to the point of being soluble in water. This allows for isolation of the high-value wood fibers.

The residual aqueous solution of degraded lignin, sodium carbonate, and sodium sulfate is commonly referred to as "black liquor." Usually, the black liquor also contains various carbohydrates. Conventional black liquor has a pH value of about 13-14. The degraded lignin present in black liquor can be isolated in discrete fractions by addition of acids to lower the pH. As the pH level is decreased, there is initial precipitation of the highest molecular weight lignin compounds. These can be separated from the residual liquor by filtration. A further reduction in the pH value results in precipitation of additional lignin compounds, which have lower molecular weight than the first fraction. This second set of precipitated compounds can also be isolated by filtration. This process can be conducted multiple times to yield an array of fractions.

Acids suitable for this process include strong acids such as sulfuric acid, nitric acid, and hydrochloric acid, or weak acids such as acetic acid or carbonic acid—the latter may be created by injecting carbon dioxide into the black liquor. The use of carbon dioxide to precipitate lignin from black liquor was described as early as 1942, for example in U.S. Pat. No. 2,282,518 to Hochwalt et al. For incorporation into a PF resin for OSB, it is important to separate the degraded lignin from the other compounds in the black liquor, such as sulfate salts and carbohydrates, which can have deleterious effects on the emission potential of a binder, the strength development rate, the ultimate bond strength, or the rate at which OSB made with the resin will absorb water.

As noted above, many prior attempts to incorporate lignin and/or spent pulping liquors into various types of phenolic resins have been made. In U.S. Pat. No. 2,282,518, lignin material isolated from black liquor and substantially free of alkaline solvents and sodium organic compounds is dissolved in a phenolic body and reacted under heat with an aldehydic material in the presence of a catalyst to make a resin for mixing with fillers and utilization in molding applications. Several other attempts, and their shortcomings, are summarized in the aforementioned US20110245381 of Winterowd et al. The subject matter thereof, and that of the references discussed therein, is incorporated herein by reference.

Some of the prior art technologies are based on the use of whole black liquor or whole spent sulfite liquor. As noted above, in practice, compounds in these whole liquors exhibit deleterious effects on the performance of a phenolic binder resin for an OSB application. Also, spent sulfite liquors contain lignosulfonate, which is largely not present in kraft lignin. The sulfonic acid groups in the lignosulfonate salts, which are present in binders that are partially comprised of sulfite liquors, tend to adversely affect the performance of the OSB when it is exposed to water.

A lignin-containing LPF resin described in the aforementioned US20110245381 of Winterowd et al. is an aqueous resole having a percent solids of about 35-65%, a pH of about 8-13, a viscosity between about 50-1,000 cps, and being composed of the alkaline metal salt of phenol/formaldehyde polymers and oligomers (40-90% of the total weight of the solids in the resin), urea (5-35% of the total weight of the solids in the resin), and a mixture of degraded lignin polymer and an alkaline metal salt of the degraded lignin polymer (5-25% of the total weight of the solids in the resin). This lignin-containing LPF resin may also contain a reaction product of the phenol/formaldehyde adduct and the degraded lignin (1-90% of the total weight of the solids in the resin), and a reaction product of the urea and free formaldehyde (0.01-5.0% of the total weight of the solids in the resin). In some embodiments, the degraded lignin polymer is lignin which has been isolated as a precipitate from kraft pulping black liquor by addition of one or more acids or carbon dioxide to adjust the pH of the black liquor to a pH of 7 to 13 and washed with water to remove the contaminants.

The degraded kraft lignin utilized in the aforementioned lignin-containing LPF resin exists as a solid at the time that it is incorporated into the LPF formulation. This "solid lignin" has been isolated from kraft liquor in a manner that removes the unwanted carbohydrates and lower molecular weight lignin material. Thus, the select lignin-containing LPF resins utilize degraded kraft lignin that has molecular weight that is greater than about 1000 Da. Thus, this lignin material is compositionally different than the lignin material in whole black liquor. As previously stated, this compositional difference impacts the performance of the resulting LPF resin.

Unfortunately, if the moisture content of the solid, relatively high molecular weight kraft lignin is relatively low (about 0-4%), then the kraft lignin solid material can be "dusty," which may create a respiratory hazard and/or a spontaneous combustion hazard during storage and transfer of the material during shipping or resin production. Conversely, if the moisture content of the solid, relatively high molecular weight kraft lignin is relatively high (8-50%), then it can be sticky and clumpy, which makes it very difficult to meter and/or transfer in a reliable, quantitative manner. Further, bulk quantities of solid, relatively high molecular weight kraft lignin powder typically have variable and inconsistent moisture content, which makes use of the material as a formulating component exceptionally problematic. Thus, there is a need to modify the form of the relatively high molecular weight kraft lignin material so that it is a uniform, consistent raw material that may be easily transported and metered in a quantitative fashion and so that it does not present a spontaneous combustion or respiratory hazard.

SUMMARY

Various embodiments of liquid kraft lignin compositions (or "formulations"), methods of their production, methods of their incorporation into kraft lignin-containing liquid phenol/formaldehyde (LPF) resins, and uses of such resins, for example in OSB and other wood composite products, are disclosed herein.

Example embodiments of a liquid kraft lignin composition according to the present disclosure include water, urea, a group 1 alkaline metal hydroxide, and kraft lignin, with water present in the amount of about 60-95% by weight, urea about 5-30% by weight, the hydroxide about 0.5-3.0% by weight, and kraft lignin about 5-25% by weight on a dry basis. In some embodiments, the kraft lignin has a molecular weight greater than about 1000 Da, such as of a degraded lignin fraction that has been precipitated from black liquor. In some embodiments, the group 1 metal hydroxide includes one or more of sodium and potassium hydroxide. The viscosity of such embodiments ranges from 5-1,000 cps.

Example methods of producing liquid kraft lignin compositions according to the present disclosure include combining urea and kraft lignin in an aqueous, alkaline medium in a reaction vessel to form a mixture, heating the mixture, maintaining the mixture in a heated state until the lignin dissolves, then cooling the mixture. In some methods, water is present in the mixture in the amount of about 60-95% by weight, urea about 5-30% by weight, and kraft lignin about 5-25% by weight on a dry basis, and the pH of the mixture is 8-13. In some methods, the pH is achieved by the presence of a group 1 alkaline metal hydroxide in the mixture in the amount of about 0.5-3.0% by weight. The heating temperature in such methods may be empirically determined from the component levels in the mixture. In some methods the mixture is maintained in a heated state no longer than to dissolve the lignin, such as to minimize the formation of ammonia from urea hydrolysis.

Example methods of assaying the lignin content of liquid kraft lignin formulations according to the present disclosure include measuring the UV absorbance of the formulation. In some methods, the measuring is performed at a wavelength of about 195-200 nm.

Example methods of producing an aqueous kraft lignin-containing bonding resin using a liquid kraft lignin composition, such as those disclosed herein, include mixing such a composition with phenol and a formaldehyde source while maintaining a desired pH range, reacting the ingredients until the viscosity of the mixture is about 200-500 cps, subsequently cooling the reaction product, and adding a group 1 alkaline metal hydroxide and, optionally, urea, until a desired pH and/or viscosity range is achieved.

The concepts, features, compositions, and methods briefly described above are clarified with reference to the detailed description below.

DETAILED DESCRIPTION

The present disclosure is directed toward stable, consistent, liquid kraft lignin-containing compositions, methods of their production, and various methods of their use, including in preparing kraft-lignin-containing LPF resins, which may in turn be used in producing OSB or other wood-based composites, and so forth. The present disclosure is also directed toward assaying the lignin content in such liquid kraft lignin-containing compositions.

In general, the liquid kraft lignin-containing compositions consistent with the present disclosure include water, urea, a group 1 alkaline metal hydroxide, and kraft lignin. As noted above, kraft lignin is substantially free of sulfonic acid groups, which are recognized as adversely affecting OSB performance upon exposure to water.

In some non-exclusive, illustrative embodiments, a liquid kraft lignin-containing formulation is composed of water (about 60-95% by weight), urea (about 5-30% by weight), a group 1 alkaline metal hydroxide (about 0.5-3.0% by weight), and kraft lignin (about 5-25% by weight on a dry basis). In such embodiments, the kraft lignin is a phenylpropane polymer that has been isolated as a precipitate from kraft pulping black liquor, for example by addition of one or more acids or carbon dioxide to adjust the pH of the black liquor to a pH of 7 to 13, and washed with water to remove the contaminants.

In general, the levels of the different components are selected to achieve a composition in the final formulation that exhibits sufficient phase stability to allow a suitable shelf-life (e.g., 1-4 weeks) as well as meterability, homogeneity or consistent component levels throughout the formulation, a desired pH range (e.g., 8-12), a desired viscosity range (e.g. 5-1,000 cps, or more particularly 50-500 cps, or 50-300 cps, etc.), and so forth, typically while maximizing the amount of lignin incorporated into the formulation. As such, in some formulations according to the present disclosure, kraft lignin is present in the amount of approximately 15-25% by weight on a dry basis.

In one non-exclusive, example embodiment of a liquid kraft lignin-containing composition in accordance with the present disclosure (described below as "Example A"), kraft lignin is present in the amount of about 20.6% by weight, water in the amount of about 61.5% by weight, urea in the amount of about 14.9% by weight, and a group 1 alkaline metal hydroxide in the amount of about 1.5% by weight.

Examples of group 1 alkaline metal hydroxides suitable for the compositions of the present disclosure include sodium hydroxide and potassium hydroxide, but may also include lithium hydroxide, rubidium hydroxide, cesium hydroxide, and francium hydroxide. Other alkaline materials such as sodium carbonate and potassium carbonate may be used in place of or in addition to the group 1 alkaline metal hydroxide, in which case there may be residuals of the carbonates in the resulting compositions and/or resins incorporating such resins, including bicarbonates.

The kraft lignin, also referred to herein as degraded lignin, or degraded lignin polymer, may be obtained from the substance commonly known as "black liquor" generated from the kraft pulping process. In the kraft process, black liquor is formed by steeping wood chips in solutions of sodium sulfide and sodium hydroxide at elevated temperatures for a period of time, and subsequent removal of the cellulosic fibers. The residual liquor is dark in color due to the presence of degraded lignin; hence the term "black liquor." The black liquor can be derived from wood chips, including those from softwoods or hardwoods. Softwoods can include pine (e.g. loblolly, lodgepole, slash, pitch, ponderosa, shortleaf, yellow, white, jack and red), fir (e.g. Douglas, Frazier, white, balsam, Pacific silver, sub alpine), cedar (e.g. Alaskan, Northern white, Eastern red, Western red, incense, Port Orford), spruce (e.g. red, white, black, englemann, Sitka), hemlock (e.g. Eastern, Western, Mountain, larch) and others. Hardwoods can include oak (white, red, bur, live), poplar (yellow, balsam, quaking aspen, big tooth), maple (sugar, silver, red), basswood, birch, alder, beech, gum, cherry, cypress, elm, hack berry, hickory, sassafras, sycamore, cucumber, walnut, locust and others. In the aforementioned "Example A" embodiment, kraft lignin was isolated from black liquor derived from Southern yellow pine wood chips subjected to the kraft pulping process.

Degraded lignin polymers suitable for this invention may be those isolated from black liquor by addition of strong acids, such as sulfuric acid, nitric acid, and hydrochloric acid, or weak acids such as acetic acid or carbonic acid. As noted above, acidification of the black liquor results in precipitation of the degraded lignin polymer, which can then be isolated by filtration. In one non-exclusive, illustrative embodiment, the kraft lignin is that isolated as a precipitate from kraft pulping black liquor by addition of one or more acids or carbon dioxide to adjust the pH of the black liquor to about 7-13, and then washed with water to remove contaminants. However, lignin precipitated at other pH levels may be used, such as to achieve a lignin fraction having a target molecular weight range. One suitable example molecular weight range is a molecular weight greater than about 1000 Da.

In general, methods of producing the liquid kraft lignin-containing compositions according to the present disclosure include combining urea and kraft lignin in an aqueous, alkaline medium in a suitable reactor, such as a vessel equipped with a mixing device and a heating/cooling system, heating to a temperature suitable for dissolution of the lignin, maintaining the mixture at that temperature until the lignin is dissolved, then cooling the mixture. The heating temperature may be empirically determined from the component levels of the mixture, but a countervailing concern in the heating process is to avoid or minimize the formation of ammonia from urea hydrolysis while ensuring that the lignin dissolves. One suitable approach, therefore, is to rapidly heat the components while mixing, and to maintain the mixture at the elevated temperature only long enough to dissolve the lignin, then subsequently cooling.

For example, in some non-exclusive, illustrative methods, a reactor is charged with water (about 60-95% by weight), urea (about 5-30% by weight), a group 1 alkaline metal hydroxide (about 0.5-3.0% by weight), and kraft lignin (about 5-25% by weight on a dry basis). The contents are then vigorously and continuously stirred while heated to a temperature of about 95° C. over a period of about 15-60 minutes. Stirring continues while the mixture is maintained at a temperature of about 95° C. for a period of about 15-45 minutes, which should be sufficient to dissolve the kraft lignin. As noted above, maintaining the mixture at elevated temperatures for longer periods increases the potential for significant levels of urea hydrolysis. The mixture is then cooled to a temperature of about 20° C.

To further reduce the potential for urea hydrolysis, the heating and cooling steps may be performed rapidly. For example, in an illustrative method used in producing the aforementioned "Example A" composition, the mixture was heated to 95° C. over a period of about 20 minutes, maintained at 95° C. for about 15 minutes, then cooled to 20° C. over a period of about 15 minutes.

In some methods, the group 1 alkaline metal hydroxide is in the form of sodium hydroxide, but as noted above, other group 1 alkaline metal hydroxides, or a combination thereof, may be used.

The resulting liquid lignin formulations may offer advantages over solid lignin, such as by providing lignin in a stable, liquid form that is more easily transported, stored, and quantitatively metered as compared with equivalent quantities of solid lignin, and that does not present the respiratory or combustion concerns associated with solid lignin.

Furthermore, the formulations of the present disclosure include a solvent matrix compatible with LPF resin chemistry. Thus, as explained in greater detail below, the resulting formulations may be conveniently incorporated into an LPF resin. Accordingly, some of such methods may further include reacting the liquid kraft lignin-containing composition with phenol and paraformaldehyde in an alkaline solution to yield a kraft lignin-containing LPF resin.

The liquid lignin compositions may be subjected to quality control tests that include measurements of pH, percent solids, viscosity, osmometry, UV absorbance spectroscopy, and so forth. In particular, the UV absorbance, especially at a wavelength of about 195-200 nm, can be empirically correlated to the kraft lignin concentration of the batch, and thus may serve as a useful quality control metric. Accordingly, some of such methods may further include subsequently assaying the lignin content of the liquid kraft lignin-containing composition via UV spectroscopy.

Indeed, UV absorbance, especially at a wavelength of about 195-200 nm, may be effective to assay the lignin content of an aqueous, alkaline, urea-containing kraft lignin composition, independent of the precise method by which such a composition is produced, owing to the UV absorbance of the different components in such a composition. As such, methods of the present disclosure of assaying the lignin content of an aqueous, alkaline, urea-containing kraft lignin composition, include measuring the UV absorbance of the composition, for example at a wavelength of about 195-200 nm.

In general, methods of producing an aqueous kraft lignin-containing bonding resin using a liquid kraft lignin-containing composition according to the present disclosure include a first stage reaction in which such a composition is mixed with phenol and a formaldehyde source while maintaining the pH of the mixture in a target range, allowing the ingredients to react until a target viscosity range is achieved. Accordingly, the first stage reaction may be considered a polymerization stage. The first stage reaction product is then cooled and optionally stabilized in a second stage reaction by making the mixture more alkaline, scavenging unreacted ingredients, and so forth.

Chemically, the resin is made by reacting formaldehyde and phenol in a suitable molar ratio (e.g. 1.5-3.5 mol formaldehyde to 1.0 mol phenol) in the presence of degraded kraft lignin, water, and a group 1 metal hydroxide at a temperature of about 60-100° C. for a period of time sufficient to achieve a viscosity of 200-5,000 cps. The reactants may be combined in a number of ways. For example, they may all be added together in a single charge, or in several discrete charges. The latter method may allow greater control over the first stage reaction kinetics, as the reaction between the formaldehyde source (e.g., formalin, paraformaldehyde, etc.) and phenol is exothermic. Likewise, in the second stage, gradual cooling while adding an aqueous base in multiple discrete aliquots allows polymer size to increase while allowing control over the viscosity of the polymeric material.

The first stage reaction may be structured to also allow comparatively greater control over unwanted side-reactions. For example, if the level of the group 1 metal hydroxide in the first stage is too high (e.g. if the pH of the mixture is above about 8.0), the formaldehyde in the mixture is susceptible to disproportionation into methanol and formic acid via the Cannizzaro reaction, which have adverse effects on the performance of the resulting resin. Accordingly, in the methods of the present disclosure, the pH is increased after levels of free formaldehyde decrease due to polymerization. In some illustrative methods, one or more further charges of a group 1 metal hydroxide may improve the phase stability of the resulting resin as well as controlling the viscosity. In some illustrative methods, urea is added in order to scavenge unreacted formaldehyde, act as a diluent, etc.

In the illustrative methods, the formaldehyde source may include formaldehyde, paraformaldehyde, formalin, trioxane, oxazolidine, and so forth. In methods in which paraformaldehyde is used as the formaldehyde source, in the first stage, water is present in an amount of about 6.0-38.0 parts by mass, the urea- and kraft lignin-containing composition in an amount of about 1.0-30.0 parts by mass, phenol in an amount of 13.0-37.0 parts by mass, and paraformaldehyde in an amount of 6.0-32.0 parts by mass. In such methods, the water and/or paraformaldehyde may be added in the first stage in a number of successive charges.

For example, in an illustrative method used to produce an LPF resin using the aforementioned "Example A" formulation (the method being described in greater detail below as "Example B"), a reactor is initially charged with phenol (13.0-37.0 parts by mass), an aqueous urea- and kraft lignin-containing composition produced according to the present disclosure (1.0-30.0 parts by mass), 50% sodium hydroxide solution (0.1-1.0 parts by mass), paraformaldehyde (2.0-8.0 parts by mass), and water (2.0-12.0 parts by mass). The paraformaldehyde and portions of the water can be wholly or partially substituted by formalin solutions or trioxane, or oxazolidine, and so forth, such that the equivalent level of formaldehyde molecules or compounds capable of conversion to formaldehyde molecules are achieved in the mixture. The level of sodium hydroxide in the mixture is set at a level that achieves a pH value of about 7.2-8.0. This initial charge of reactants is stirred and heated to a temperature of about 75° C. over a period of about 30-60 minutes.

The contents of the reactor are stirred and maintained at a temperature of about 75° C. for a period of about 15-30 minutes. The reactor is then further charged a first time with water (1.0-6.0 parts by mass) and paraformaldehyde (1.0-6.0 parts by mass). As noted above, the paraformaldehyde and portions of the water can be wholly or partially substituted if a different or additional formaldehyde source(s) are used. After stirring and maintaining the temperature at 75° C. for 15-30 minutes, a second charge of equivalent amounts of water and formaldehyde are added, followed by a third, and a fourth, with each charge separated by suitable time periods (e.g., 15-30 minutes each) for stirring and temperature control.

The contents of the reactor are heated to increase the temperature of the mixture to about 90° C. over a period of 10-20 minutes, and maintained at that temperature until the viscosity of the mixture is about 50 cps.

Gardner-Holdt bubble tubes are commonly used to measure viscosity values in the PF resin industry, but may be difficult to use with resins produced according to the present disclosure because the dark color of the lignin-containing resin under normal lighting conditions makes such tubes hard to read (i.e. the bubble is difficult to see). Thus, viscosity may be measured with a Brookfield digital viscometer, such as a Model DV-I Prime equipped with a small sample adapter with water jacket temperature control and a SC4-18 spindle.

When the viscosity reaches about 50 cps, the reactor is charged with 50% sodium hydroxide (0.2-0.5 parts by mass) and water (0.2-0.5 parts by mass), and the contents are stirred and maintained at a temperature of about 90° C. until the viscosity reaches about 80 cps.

The reactor is again charged with 50% sodium hydroxide (0.2-0.5 parts by mass) and water (0.2-0.5 parts by mass), and the contents are stirred and cooled to a temperature of about 85° C. and maintained at this lower temperature until the viscosity of the mixture is about 200 cps.

The contents are then stirred and cooled to a temperature of about 75° C. and maintained at this lower temperature until the viscosity of the mixture is about 450 cps. The contents are stirred and cooled to a temperature of about 20° C. and maintained at this lower temperature. The reactor is then charged with 50% sodium hydroxide (6.0-15.0 parts by mass) and urea (5.0-15.0 parts by mass).

According to such methods, the resulting LPF resin made by use of the liquid kraft lignin-containing composition is an aqueous resole having a percent solids of about 35-65%, a pH of about 8-13, a viscosity of about 50-1,000 cps, and is composed of the alkaline metal salt of phenol/formaldehyde polymers and oligomers (40-90% of the total weight of the solids in the resin), urea (5-35% of the total weight of the solids in the resin), and a mixture of kraft lignin and an alkaline metal salt of the kraft lignin (5-25% of the total weight of the solids in the resin). This lignin-containing LPF resin may also contain a reaction product of the phenol/formaldehyde adduct and the kraft lignin (1-90% of the total weight of the solids in the resin), and a reaction product of the urea and free formaldehyde (0.01-5.0% of the total weight of the solids in the resin).

The resulting LPF resins may be used in the manufacture of wood-based composite products, such as OSB, and also oriented strand lumber ("OSL"), parallel strand lumber ("PSL"), laminated veneer lumber ("LVL"), medium-density fiberboard ("MDF"), and so forth, as well as foundry and other non-wood composite materials, and in other applications in which LPF resins are used.

Accordingly, the methods discussed herein may further include the use of an aqueous kraft lignin-containing bonding resin in producing a wood composite such as OSB. Such a method may involve coating wood particles or strands with a wax, and mixing the particles or strands with the resin so they will adhere in the final article. The treated particles or strands are then laid up into the article and cured under heat and pressure to form the article.

In OSB, as noted above, strands are treated with a wax and a resin, either a core layer resin for core layer strands or a surface layer resin (such as the LPF resins of the present disclosure) for the surface layer strands. However, the LPF compositions disclosed herein may be incorporated into core layers. The strands for the different layers are laid up on a caul plate and screen into a mat and are aligned along orthogonal axes. The mat, caul plate, and screen are placed in a hot press and heated and pressed to form a composite OSB panel. Typically, the surface temperature of the press platens is about 400-420° F., the initial pressure on the mat is between 500-2200 psi, and the time in the press is between 2-5 minutes depending on the panel thickness. A mat is usually compressed from around 3-6 inches to a desired thickness such as ⅝-inch.

Commercial OSB panels are usually hot when stacked into bundles, and in this configuration the elevated temperature of the OSB can persist for several days. The prolonged heat affects the OSB properties and changes the character of the resin. For example, water is removed from the resin, and the phenol/formaldehyde adducts condense into larger molecules. In OSB formed using the compositions of the present disclosure, it is theorized that the lignin reacts with the phenol/formaldehyde adducts. The pH of the wood/resin mixture is about 5.5 to 7, and at this pH level most of the phenol/formaldehyde adducts and lignin material is insoluble. During the process, some of the phenol/formaldehyde adducts are converted into load-bearing solids, which effectively transfer stress between adjacent strands.

As described in more detail below in "Example C" and "Example D," OSB panels produced using lignin-containing LPF resins were compared with panels produced using conventional LPF resins in a side-by-side internal bond strength test. The average internal bond strength of the OSB panels using lignin-containing resins produced according the methods disclosed herein compared well with the average internal bond strength of those panels made with conventional LPF resins.

EXAMPLE A

A kraft lignin-containing, liquid composition was prepared by charging a 2-liter reactor with water (931.6 g; 18° C.), urea (224.9 g), 50% sodium hydroxide aqueous solution (45.3 g), and dry kraft lignin powder (obtained from the Weyerhaeuser NR Company, derived from Southern Yellow Pine wood which was subjected to the kraft pulping process, having a molecular weight greater than about 1000 Da) (311.8 g). The contents of the reactor were vigorously and continuously stirred and heated to a temperature of 95° C. over a period of 20 minutes. The contents were continuously stirred and maintained at a temperature of 95° C. for a period of about 15 minutes. The mixture was then cooled to a temperature of 20° C. over a period of 15 minutes. The resulting mixture was a darkly colored solution with a viscosity of 25 cps, a pH of 9.74 at a temperature of 20° C. and a specific gravity of 1.109.

EXAMPLE B

A kraft lignin-containing, LPF composition was prepared by charging a 4-liter reactor with phenol (925.0 g), kraft lignin-containing solution from "Example A" (1039.3 g), 50% sodium hydroxide solution (19.0 g), 95% paraformaldehyde (240.0 g), and water (150.0 g). This initial charge of reactants was stirred and heated to a temperature of about 75° C. over a period of 30 minutes.

The contents of the reactor were stirred and maintained at a temperature of 75° C. for a period of about 15 minutes. The reactor was then further charged a first time with water (150.0 g) and 95% paraformaldehyde (150.0 g).

The contents of the reactor were stirred and maintained at a temperature of 75° C. for a period of about 15 minutes. The reactor was then further charged a second time with water (150.0 g) and 95% paraformaldehyde (150.0 g).

The contents of the reactor were stirred and maintained at a temperature of 75° C. for a period of about 15 minutes. The reactor was then further charged a third time with water (150.0 g) and 95% paraformaldehyde (150.0 g).

The contents of the reactor were stirred and maintained at a temperature of 75° C. for a period of about 15 minutes. The reactor was then further charged a fourth time with water (150.0 g) and 95% paraformaldehyde (150.0 g).

The contents of the reactor were then heated such that the temperature of the mixture was increased to 90° C. over a period of 10 minutes.

The contents of the reactor were stirred and maintained at a temperature of 90° C. until the viscosity of the mixture was about 50 cps as determined by use of a Brookfield Viscometer (#18 spindle, 12 rpm, 23° C.). The reactor was then charged with 50% sodium hydroxide (15.0 g) and water (15.0 g).

The contents of the reactor were stirred and maintained at a temperature of 90° C. until the viscosity of the mixture was about 80 cps as determined by use of a Brookfield Viscometer (#18 spindle, 12 rpm, 23° C.). The reactor was then charged with 50% sodium hydroxide (15.0 g) and water (15.0 g).

The contents of the reactor were stirred and cooled to a temperature of 85° C. and maintained at this lower temperature until the viscosity of the mixture was about 200 cps as determined by use of a Brookfield Viscometer (#18 spindle, 6 rpm, 23° C.).

The contents of the reactor were then stirred and cooled to a temperature of about 75° C. and maintained at this lower temperature until the viscosity of the mixture was about 450 cps as determined by use of a Brookfield Viscometer (#18 spindle, 3 rpm, 23° C.).

The contents of the reactor were then stirred and cooled to a temperature of about 20° C. and maintained at this lower temperature. At this point the reactor was further charged with 50% sodium hydroxide (509.0 g) and urea (414.0 g). The mixture was stirred until the urea was dissolved.

The resulting kraft lignin-containing LPF resin had a percent solids value of about 50%, a pH of about 10, and a viscosity of about 190 cps at 23° C.

EXAMPLE C

Oriented strand board (OSB) was prepared by use of a conventional LPF resin in the following manner. Wooden strands (25-50 mils thick, 0.25-1.5" wide, 0.25-3.0" long, mixture of aspen, pine and maple species) designated as "core-layer strands" were dried to a moisture content of about 2-3% and were then transferred into a front-load, cylindrical-shaped "blender" compartment (2' depth, 6' diameter). The axis of rotation of the blender was parallel to the laboratory floor. The rotating interior surface of the blender compartment was equipped with multiple pegs (2" height, 0.25" diameter). The rotation rate of the blender was set at 11 rpm, which was appropriate to cause the strands to be carried to the top of the interior region of the blender compartment and to then fall to the bottom of the compartment in a cascading, "waterfall-like" action. The blender was further equipped with a spray application system for molten neat wax as well as a spray application system for liquid bonding resins. A conventional slack wax emulsion, known as 431B (manufactured by The International Group Incorporated, of Toronto, Ontario) was sprayed onto the wooden strands at a loading level of 0.75% based on the dry mass of the wood. A pMDI resin, known as Rubinate 1840 (manufactured by Huntsman Polyurethanes, The Woodlands, Tex.), was then sprayed onto the strands at a loading level of 6.0% based on the dry mass of the wood. The treated core-layer strands were then removed from the blender.

Additional wooden strands (25-50 mils thick, 0.25-1.5" wide, 0.25-3.0" long, mixture of aspen, pine and maple species) designated as "surface-layer strands" were dried to a moisture content of about 2-3% and were then loaded into the blender compartment. Slack wax emulsion 431B was sprayed onto the wooden strands at a loading level of 0.75% based on the dry mass of the wood. A conventional LPF resin, known as 265C08 (manufactured by the Georgia-Pacific Resins Corporation, Decatur, Ga.), was then sprayed onto the strands at a loading level of 2.0% based on the solids content of the resin and the dry mass of the wood. The treated surface-layer strands were then removed from the blender.

The treated strands were formed on top of a screen and caul plate into a four-layered mat that was comprised of one bottom surface layer, two middle core layers, and one top surface layer. The length of the mat was 24" and the width of the mat was also 24". The strands in the surface layers were oriented in a direction that was generally parallel to one of the major axis of the mat, while the strands in the core layer were oriented in a direction that was perpendicular to the surface strand orientation. The total mass of the mat was about 4,100 g. The two surface layers constituted 50% of the mass of the mat, while the two core layers constituted 50% of the mass of the mat. The thickness of the mat was about 5".

The mat, as well as the caul plate and screen that were supporting the mat, were then transferred onto the bottom platen of an "open" hot-press. The top and bottom platens were maintained at a surface temperature of 410° F. A control system was immediately activated in order to begin closing the gap between the top and bottom platens until the distance between them was 0.719". The time required to achieve this compression process was about 60 s. The maximum pressure exerted on the mat was about 600-650 psi. The gap between the platens was maintained at 0.719" for a period of 190 s, and was then increased to 0.749" over a period of 30 s. The gap between the platens was then rapidly opened and the resulting, consolidated OSB panel was removed from the press.

The hot OSB panel was then transferred into an oven, which was maintained at a temperature of 80° C. for a period of 24 h. The panel was then removed from the oven and placed into a conditioning chamber that was maintained at a relative humidity of 50% and a temperature of 20° C.

Three replicate panels were made in this manner. Six test specimens (2"×2") were cut from each conditioned laboratory panel. Each test specimen was then subjected to an "as-is" internal bond strength test (ASTM D1037). The average internal bond strength was 73.8 psi.

EXAMPLE D

Oriented strand board (OSB) was prepared by use of the kraft lignin-containing, LPF formulation from "Example B" in the following manner. Wooden strands (25-50 mils thick, 0.25-1.5" wide, 0.25-3.0" long, mixture of aspen, pine and maple species) designated as "core-layer strands" were dried to a moisture content of about 2-3% and were then transferred into a front-load, cylindrical-shaped "blender" compartment (2' depth, 6' diameter). The axis of rotation of the blender was parallel to the laboratory floor. The rotating interior surface of the blender compartment was equipped with multiple pegs (2" height, 0.25" diameter). The rotation rate of the blender was set at 11 rpm, which was appropriate to cause the strands to be carried to the top of the interior region of the blender compartment and to then fall to the bottom of the compartment in a cascading, "waterfall-like" action. The blender was further equipped with a spray application system for molten neat wax as well as a spray application system for liquid bonding resins. Slack wax emulsion 431B was sprayed onto the wooden strands at a loading level of 0.75% based on the dry mass of the wood. The pMDI Rubinate 1840 was then sprayed onto the strands at a loading level of 6.0% based on the dry mass of the wood. The treated core-layer strands were then removed from the blender.

Additional wooden strands (25-50 mils thick, 0.25-1.5" wide, 0.25-3.0" long, mixture of aspen, pine and maple species) designated as "surface-layer strands" were dried to a moisture content of about 2-3% and were then loaded into the blender compartment. Slack wax emulsion 431B was sprayed onto the wooden strands at a loading level of 0.75% based on the dry mass of the wood. The kraft lignin-containing, LPF formulation from "Example B" was then sprayed onto the strands at a loading level of 2.0% based on the solids content of the resin and the dry mass of the wood. The treated surface-layer strands were then removed from the blender.

The treated strands were formed on top of a screen and caul plate into a four-layered mat that was comprised of one bottom surface layer, two middle core layers, and one top surface layer. The length of the mat was 24" and the width of the mat was also 24". The strands in the surface layers were oriented in a direction that was generally parallel to one of the major axis of the mat, while the strands in the core layer were oriented in a direction that was perpendicular to the surface strand orientation. The total mass of the mat was about 4,100 g. The two surface layers constituted 50% of the mass of the mat, while the two core layers constituted 50% of the mass of the mat. The thickness of the mat was about 5".

The mat, as well as the caul plate and screen that were supporting the mat, were then transferred onto the bottom platen of an "open" hot-press. The top and bottom platens were maintained at a surface temperature of 410° F. A control system was immediately activated in order to begin closing the gap between the top and bottom platens until the distance between them was 0.719". The time required to achieve this compression process was about 60 s. The maximum pressure exerted on the mat was about 600-650 psi. The gap between the platens was maintained at 0.719" for a period of 190 s and was then increased to 0.749" over a period of 30 s. The gap between the platens was then rapidly opened and the resulting, consolidated OSB panel was removed from the press.

The hot OSB panel was then transferred into an oven, which was maintained at a temperature of 80° C. for a period of 24 h. The panel was then removed from the oven and placed into a conditioning chamber that was maintained at a relative humidity of 50% and a temperature of 20° C.

Three replicate panels were made in this manner. Six test specimens (2"×2") were cut from each conditioned laboratory panel. Each test specimen was then subjected to an "as-is" internal bond strength test (ASTM D1037). The average internal bond strength was 71.9 psi.

Illustrative, non-exclusive examples of descriptions of some compositions and methods in accordance with the scope of the present disclosure are presented in the following numbered paragraphs. The following paragraphs are not intended to be an exhaustive set of descriptions, and are not intended to define minimum or maximum scopes, or required elements or steps, of the present disclosure. Rather, they are provided as illustrative examples of selected compositions and methods that are within the scope of the present disclosure, with other descriptions of broader or narrower scopes, or combinations thereof, not specifically listed herein still being within the scope of the present disclosure.

A. A kraft lignin-containing composition including:
water in the amount of approximately 60-95% by weight;
urea in the amount of approximately 5-30% by weight;
a group 1 alkaline metal hydroxide in the amount of approximately 0.5-3.0% by weight; and
kraft lignin in the amount of approximately 5-25% by weight on a dry basis.

A.1. The composition of paragraph A, wherein the pH of the composition is in the range of 8 to 12.

A.2. The composition of paragraph A or A.1, wherein the viscosity of the composition is one or more of 5-1,000 cps, 50-500 cps, and 50-300 cps.

A.3. The composition of any of paragraphs A through A.2, wherein the kraft lignin is present in the amount of approximately 15-25% by weight on a dry basis.

A.4 The composition of any of paragraphs A through A.3, wherein the kraft lignin has a molecular weight greater than about 1000 Da.

A.5 The composition of any of paragraphs A through A.4, wherein the group 1 alkaline metal hydroxide includes one or more of sodium hydroxide and potassium hydroxide.

A.6 The composition of any of paragraphs A through A.5, wherein the water is present in the amount of about 61.5% by weight, the urea in the amount of about 14.9% by weight, the group 1 alkaline metal hydroxide in the amount of about 1.5% by weight, and the kraft lignin in the amount of about 20.6% by weight.

A.7 An aqueous kraft lignin-containing LPF resin produced from the composition of any of paragraphs A through A.6.

A.8 A wood-based composite incorporating the bonding resin of paragraph A.7.

B. A method of producing a kraft lignin-containing composition, the method including:
combining urea and kraft lignin in an aqueous, alkaline medium in a reaction vessel to form a mixture, wherein water is present in the mixture in the amount of approximately 60-95% by weight, urea in the amount of approximately 5-30% by weight, and kraft lignin in the amount of approximately 5-25% by weight on a dry basis, and wherein the pH of the mixture is 8-13;

heating the mixture to a temperature sufficient to dissolve the kraft lignin;

maintaining the mixture at the temperature until the lignin is substantially dissolved; and subsequently cooling the mixture containing the dissolved kraft lignin, to yield a liquid kraft lignin-containing composition.

B.1 The method of paragraph B, wherein a group 1 alkaline metal hydroxide is present in the mixture in the amount of approximately 0.5-3.0% by weight.

B.2 The method of paragraph B or B.1, wherein the group 1 alkaline metal hydroxide includes one or more of sodium hydroxide and potassium hydroxide.

B.3. The method of any of paragraphs B through B.2, wherein the temperature is approximately 95° C.

B.4 The method of any of paragraphs B through B.3, wherein the heating is performed over a period of about 15-60 minutes.

B.5 The method of any of paragraphs B through B.4, wherein the maintaining includes maintaining for a period of about 15-45 minutes.

B.6 The method of any of paragraphs B through B.5, wherein the cooling includes cooling to approximately 20° C.

B.7 The method of any of paragraphs B through B.6, wherein the cooling is performed prior to significant urea hydrolysis occurring in the heated mixture.

B.8 The method of any of paragraphs B through B.7, further including subsequently assaying the lignin content of the liquid kraft lignin-containing composition via UV spectroscopy.

B.9 The method of any of paragraphs B through B.8, further including reacting the liquid kraft lignin-containing composition with phenol and paraformaldehyde in an alkaline solution to produce a kraft lignin-containing LPF resin.

B.10. The method of any of paragraphs B through B.9, wherein water is present in the mixture in an amount of about 61.5% by weight, urea in the amount of about 14.9% by weight, kraft lignin in the amount of about 20.6% by weight, and a group 1 alkaline metal hydroxide in the amount of about 1.5% by weight.

B.11 The liquid kraft lignin-containing composition produced by the method of any of paragraphs B through B.10.

C. A method of producing a bonding resin, the method including:

in a first stage, mixing an aqueous urea- and kraft lignin-containing composition with phenol and a formaldehyde source while maintaining the pH of the mixture at about 7.2-8.0;

reacting the ingredients at a temperature of about 60-100° C. until the viscosity of the mixture is about 200-500 cps to yield a first stage reaction product;

subsequently cooling the first stage reaction product to a temperature less than about 60° C.; and in a second stage, adding a group 1 alkaline metal hydroxide to the cooled first stage reaction product, while maintaining the temperature less than about 60° C., until pH is about 8-13;

wherein the urea- and kraft lignin-containing composition comprises:

water in the amount of approximately 60-95% by weight;
urea in the amount of approximately 5-30% by weight;
a group 1 alkaline metal hydroxide in the amount of approximately 0.5-3.0% by weight; and
kraft lignin in the amount of approximately 5-25% by weight on a dry basis.

C.1 The method of paragraph C, wherein the formaldehyde source includes one or more of formaldehyde, paraformaldehyde, formalin, trioxane, and oxazolidine.

C.2 The method of paragraph C or C.1, wherein the formaldehyde source includes paraformaldehyde, and wherein in the first stage, water is present in an amount of about 6.0-38.0 parts by mass, the urea- and kraft lignin-containing composition in an amount of about 1.0-30.0 parts by mass, phenol in an amount of 13.0-37.0 parts by mass, and paraformaldehyde in an amount of 6.0-32.0 parts by mass.

C.3 The method of any of paragraphs C through C.2, wherein the reacting includes adding one or more of water and paraformaldehyde in a number of successive charges.

C.4 The method of any of paragraphs C through C.3, wherein the group 1 alkaline metal hydroxide includes one or more of sodium hydroxide and potassium hydroxide.

C.5 The method of any of paragraphs C through C.4, wherein the final viscosity of the second stage reaction is one or more of 50-1,000 cps, 100-500 cps, and 120-350 cps.

C.6 The method of any of paragraphs C through C.5, wherein in the second stage, urea is also added.

C.7 The method of paragraph C.6, wherein urea is added in an amount sufficient to scavenge unreacted formaldehyde present in the second stage.

C.8. The aqueous kraft lignin-containing bonding resin produced by the method of any of paragraphs C through C.7.

C.9 A wood-based composite incorporating the bonding resin of paragraph C.8.

C.10 The wood-based composite of paragraph C.9, wherein the wood-based composite product includes oriented strandboard.

D. A method of assaying the lignin content of an aqueous, alkaline, urea-containing kraft lignin composition, the method including measuring the UV absorbance of the composition.

D.1 The method of paragraph D, wherein the measuring is performed at a wavelength of about 195-200 nm.

Although the present invention has been shown and described with reference to the foregoing operational principles and illustrated examples and embodiments, it will be apparent to those skilled in the art that various changes in form and detail may be made without departing from the spirit and scope of the invention. The present invention is intended to embrace all such alternatives, modifications and variances that fall within the scope of the appended claims.

What is claimed is:

1. A liquid kraft lignin-containing composition comprising:

water in the amount of approximately 60-89.5% by weight;
urea in the amount of approximately 5-30% by weight;
a group 1 alkaline metal hydroxide in the amount of approximately 0.5-3.0% by weight; and
kraft lignin in the amount of approximately 5-25% by weight on a dry basis;
wherein the composition is a solution; and
wherein the composition exhibits phase stability for 1-4 weeks.

2. The composition of claim 1, wherein the pH is in the range of 8 to 12.

3. The composition of claim 1, wherein the viscosity of the composition is 5-1,000 cps.

4. The composition of claim 3, wherein the viscosity of the composition is 50-500 cps.

5. The composition of claim 3, wherein the viscosity of the composition is 50-300 cps.

6. The composition of claim 1, wherein the kraft lignin is present in the amount of approximately 15-25% by weight on a dry basis.

7. The composition of claim 1, wherein the kraft lignin has a molecular weight greater than about 1000 Da.

8. The composition of claim 1, wherein the group 1 alkaline metal hydroxide includes one or more of sodium hydroxide and potassium hydroxide.

9. The composition of claim 1, wherein the water is present in the amount of about 61.5% by weight, the urea in the amount of about 14.9% by weight, the group 1 alkaline metal hydroxide in the amount of about 1.5% by weight, and the kraft lignin in the amount of about 20.6% by weight.

10. An aqueous kraft lignin-containing LPF resin produced from the composition of claim 1.

11. A method of producing a kraft lignin-containing composition, the method comprising:
    combining urea and kraft lignin in an aqueous, alkaline medium in a reaction vessel to form a mixture, wherein water is present in the mixture in the amount of approximately 60-89.5% by weight, urea in the amount of approximately 5-30% by weight, a group 1 alkaline metal hydroxide in the amount of approximately 0.5-3.0% by weight, and kraft lignin in the amount of approximately 5-25% by weight on a dry basis, and wherein the pH of the mixture is 8-13;
    heating the mixture to a temperature sufficient to dissolve the kraft lignin;
    maintaining the mixture at the temperature until the lignin is substantially dissolved; and
    subsequently cooling the mixture containing the dissolved kraft lignin, to yield a liquid kraft lignin-containing composition, wherein the composition exhibits phase stability for 1-4 weeks.

12. The method of claim 11, wherein the group 1 alkaline metal hydroxide includes one or more of sodium hydroxide and potassium hydroxide.

13. The method of claim 11, wherein the temperature is approximately 95° C.

14. The method of claim 11, wherein the cooling includes cooling to approximately 20° C.

15. The method of claim 11, wherein the cooling is performed prior to significant urea hydrolysis occurring in the heated mixture.

16. The method of claim 11, further comprising subsequently assaying the lignin content of the liquid kraft lignin-containing composition via UV spectroscopy.

17. The method of claim 11, further comprising reacting the liquid kraft lignin-containing composition with phenol and paraformaldehyde in an alkaline solution to produce a kraft lignin-containing LPF resin.

18. The method of claim 11, wherein water is present in the mixture in an amount of about 61.5% by weight, urea in the amount of about 14.9% by weight, kraft lignin in the amount of about 20.6% by weight, and a group 1 alkaline metal hydroxide in the amount of about 1.5% by weight.

19. The liquid kraft lignin-containing composition produced by the method of claim 11.

* * * * *